United States Patent
Bryant

(10) Patent No.: US 10,422,675 B2
(45) Date of Patent: Sep. 24, 2019

(54) SYSTEM AND METHOD FOR MONITORING MUD FLOW IN A COMPONENT OF DRILLING SYSTEM

(71) Applicant: APS Technology, Inc., Wallingford, CT (US)

(72) Inventor: Thomas M. Bryant, Glastonbury, CT (US)

(73) Assignee: APS Technology, Inc., Wallingford, CT (US)

( * ) Notice: Subject to any disclaimer, the term of this patent is extended or adjusted under 35 U.S.C. 154(b) by 155 days.

(21) Appl. No.: 15/618,646

(22) Filed: Jun. 9, 2017

(65) Prior Publication Data

US 2018/0356268 A1 Dec. 13, 2018

(51) Int. Cl.
*G01F 1/66* (2006.01)
*E21B 47/10* (2012.01)

(52) U.S. Cl.
CPC ............ *G01F 1/667* (2013.01); *E21B 47/101* (2013.01)

(58) Field of Classification Search
CPC ....... G01F 1/667; G01F 1/845; G01F 23/2962
See application file for complete search history.

(56) References Cited

U.S. PATENT DOCUMENTS

| | | | |
|---|---|---|---|
| 8,525,690 B2 | 9/2013 | Puro et al. | |
| 8,535,690 B2 | 9/2013 | Cabezon-Silva et al. | |
| 2015/0268077 A1* | 9/2015 | Mezheritsky | B01B 1/00 73/861.28 |
| 2017/0328152 A1* | 11/2017 | Jaffrey | E21B 21/08 |

\* cited by examiner

*Primary Examiner* — David M. Gray
*Assistant Examiner* — Andrew V Do
(74) *Attorney, Agent, or Firm* — Offit Kurman, P.C.; Gregory A. Grissett

(57) ABSTRACT

A flow monitoring system for monitoring fluid flow. The flow monitoring system including a conduit, a first transducer, a second transducer, and a flow diverter. The conduit has an inner surface that defines a flow channel extending through the conduit. The conduit defines a bore extending from the inner surface to an outer surface. The first transducer is positioned within the bore of the conduit, such that at least a portion of the first transducer extends into the flow channel. The second transducer is positioned such that the second transducer can send and receive signals propagating through at least a portion of the flow channel to and from the first transducer. The flow diverter is positioned within the flow channel of the conduit adjacent to the first transducer and the second transducer.

29 Claims, 6 Drawing Sheets

SYSTEM AND METHOD FOR MONITORING MUD FLOW IN A COMPONENT OF DRILLING SYSTEM

TECHNICAL FIELD

The present invention relates to a fluid flow monitoring system and method, and more particularly, to systems and methods for monitoring fluid flow in a drilling operation.

BACKGROUND

Acoustic flow meters are used to measure fluid flow and take other fluid measurements. For example, acoustic flow meters can be used to measure flow velocity, flow rate, Reynolds Number, and acoustic speed. Such fluid flow measurements can be employed for a variety of fluids, including liquids, slurries, drilling mud, and multiphase flowable materials. Acoustic flow meters generally include a pair of transducers clamped, installed, fitted, or otherwise attached to a flowmeter body, which is usually composed of a pipe disposed between connecting structures on each end. Each transducer is mounted opposite the other transducer and can transmit and receive signals to the other transducer through the fluid passing through the pipe. Based on the propagation time and/or wave phases between the transducers, fluid flow measurements can be ascertained.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Acoustic flow meters can provide accurate flow measurements, but are often limited in various ways, especially in a drilling environment. For example, flow meters may be restricted to a range of flow rates and fluid densities, or they can possess upper limits that can be constrained by signal attenuation caused by a pipe. In a flow meter having a pair of transducers attached to a pipe, such as a drill string, acoustic signals traveling through the pipe can create a high-magnitude early arrival at one of the transducers which can effectively obstruct any signal traveling a path through a fluid in the pipe. An embodiment of the present disclosure is flow monitoring system for measuring fluid properties of a drilling mud flowing through a drilling system component.

An embodiment of the disclosure is a flow monitoring system for monitoring fluid flow in a drilling system. The flow monitoring system may include a conduit having an inner surface and an outer surface, the inner surface defining a flow channel extending through the conduit. The conduit defining a bore extending from the inner surface to the outer surface. The flow monitoring system includes a first transducer positioned within the bore of the conduit, such that at least a portion of the first transducer extends into the flow channel. The flow monitoring system includes a second transducer positioned such that the second transducer can send and receive signals propagating through at least a portion of the flow channel to and from the first transducer.

A flow monitoring system for a drilling system includes a conduit having an inner surface and an outer surface, the inner surface defining a flow channel extending through the tool body. The conduit defines a bore extending from the inner surface to the outer surface. The flow monitoring system includes a first transducer positioned within the bore of the conduit, such that at least a portion of the first transducer extends into the flow channel. The flow monitoring system includes a second transducer positioned such that the second transducer can send and receive signals propagating through at least a portion of the flow channel to and from the first transducer. The flow monitoring system includes a flow diverter positioned within the flow channel of the conduit adjacent to the first transducer and the second transducer. The flow diverter partially surrounds the first and second transducers. It should be appreciated that the flow monitoring system may be at least portion of a top sub located at the surface, at least a portion of an inlet pipe, e.g. a stand pipe between the mast and mud tank, at least a portion of a return pipe to a mud tank, and/or at a downhole location along a drill string.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein.

DESCRIPTION OF THE PREFERRED EMBODIMENTS

Figure 1:
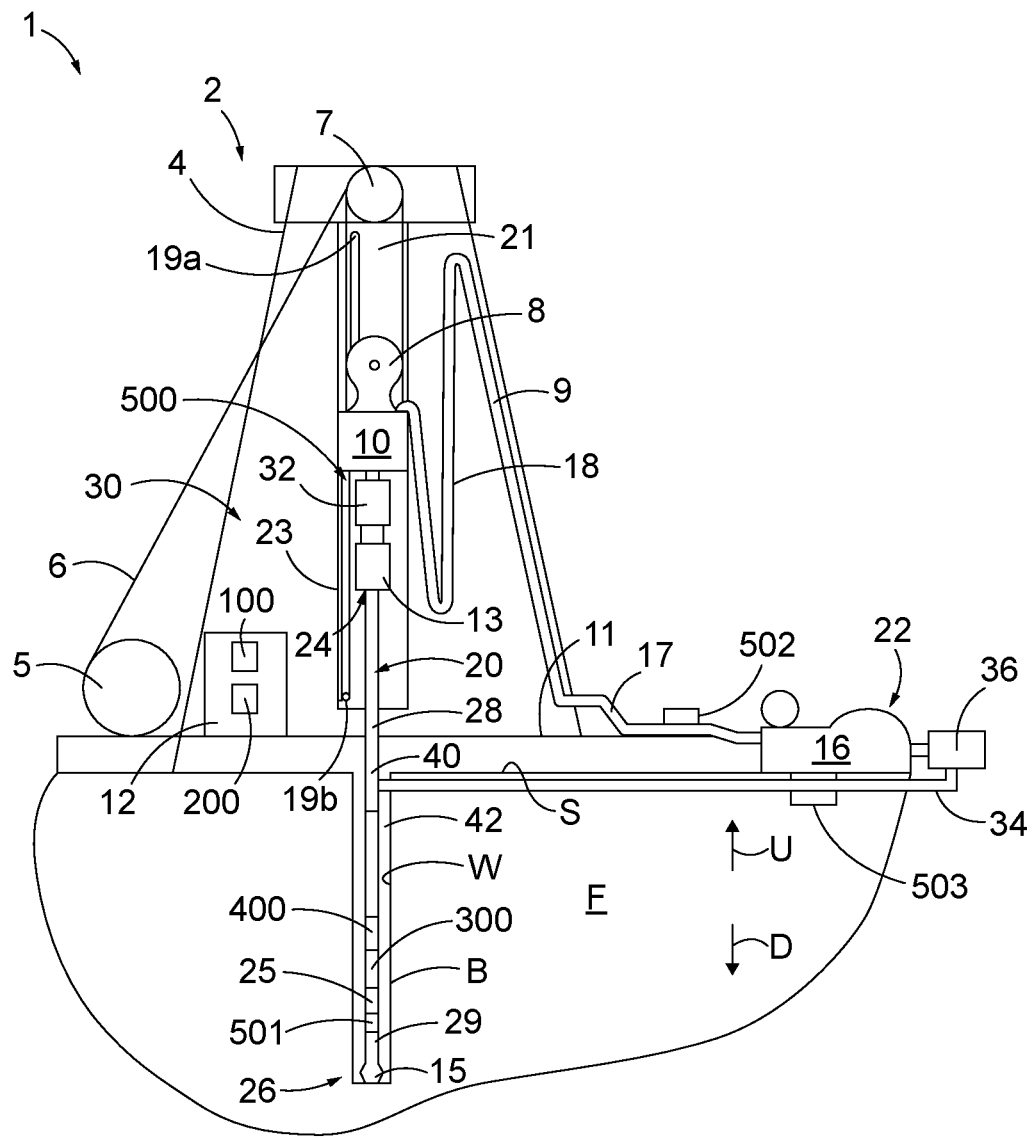
FIG. 1 illustrates a side schematic view of a drilling system including a monitoring system, according to an embodiment of this disclosure.

Preferred embodiments of the present disclosure include a flow monitoring system used to obtain data during a drilling operation of a drilling system 1. As shown in FIG. 1, the drilling system 1 includes a drill string 20 configured to define a borehole B in an earthen formation F during a drilling operation. The drilling system 1 also includes a monitoring system 30 used to monitor and transmit information concerning the drilling operation between various components of the drilling system 1. As illustrated, the monitoring system 30 may include a surface communication system 100, a surface control system 200, one or more downhole tools 300 used downhole during a drilling operation, and a downhole communication system 400. The downhole communications system 400 can be used to transmit downhole data to the surface control system 200. In accordance with various embodiments of the present disclosure, the drill monitoring system 30 includes a flow monitoring system 500 configured to measure various parameter of drilling mud passing through the components of the drilling system. In certain examples, the flow monitoring system may obtain a volumetric flow rate, fluid density, or still other drilling parameters concerning the drilling mud. In some embodiments, such as in drilling system that include top drive 10 as shown in FIG. 1, the drilling monitoring system 30 may optionally include an instrumented top sub 32. The instrumented top sub 32 is configured to obtain surface data concerning various parameters of interest and transmit the obtained surface data to the surface control system 200 via the surface communication system 100.

The drilling operation can be controlled in response to operator inputs into the surface control system 200. A "drilling operation" as used herein may include, but is not limited to, rig set-up, make-up, tripping in (or out), and/or active drilling runs where drilling into the formation F occurs. The monitoring system 30 may obtain and process surface data and/or downhole data for use in the control and operation of the drilling system 1. "Surface data" as used herein means data obtained by sensors that are at or above the surface S of the formation F. "Downhole data" as used herein means data obtained by tools that are located downhole in the borehole B during a drilling run. Furthermore, the monitoring system 30 can obtain and process drilling data, and, in combination with one or more models (such as a drill string model), monitor drilling parameters or compliance to certain predetermined thresholds. For instance, the system 30 can also be used to monitor complex dynamics, such as vibration, and alert the operator when measured parameters approach a critical threshold.

The drilling system 1 includes a drilling rig 2 that is configured to support and operate the drill string 20, and a fluid management system 22 used to control and manage flow of drilling fluid through the drill string 20 and bit 15 as further described below. The drilling rig 2 includes a drill bit 15 and the drill string 20. The drill bit 15 is coupled to a downhole end 26 of the drilling string 20 and is designed to cut into the formation F to define the borehole B. The drilling rig 2 includes a mast 4, a drill floor 11 located at or above the surface S of the formation F, a driller's cabin 12, and draw works 5. The mast 4 supports the drill string 20, as well as various components of the rig 2, such as the crown sheave 7, traveling block 8, and the top drive unit 10. The draw works 5 are connected to the traveling block 8 and crown sheave 7 via the drill line 6. The top drive unit 10 is fixed to the traveling block 8 and moveably attached to a top drive running rail 21. The instrumented sub 32 when present is positioned below the top drive unit 10. Two pulleys 19a, 19b are attached to the running rail 21 and include a depth line 23. One end of depth line 23 is attached to the top drive unit 10. From driller's station 12 located on the drill floor 11, the driller can control the upward and downward movement of the drill string 20 by "taking in" or "paying out" drill line 6, which in turn changes the position of the top drive unit 10 relative to rig floor 11.

The drill string 20 includes an uphole end 24 located at or near the surface S of the formation F and a downhole end 26 that extends into the borehole B of the formation F along a downhole direction D. A downhole (or downstream) direction D refers to the direction from the surface S toward a bottom end (not numbered) of the borehole B and an uphole (upstream) direction U refers the direction from the bottom end of the borehole B toward the surface S. Accordingly, "downhole" or "downhole location" means a location toward to the bottom end of the drill string 20 relative to the surface S from a reference point. Accordingly, "uphole" or "uphole location" means a location toward the surface relative to the surface S from a reference point that is downhole.

The drill string 20 includes multiple drill string tubulars 28 connected end-to-end and a bottom hole assembly 29. Each drill string tubular 28 has threaded connectors at each of its opposing ends. The threaded connectors are formed in accordance with API standards and may be box or pin type ends. The drill string tubulars 28 can be threadably connected end-to-end during a make-up operation. The bottom hole assembly 29 includes one or more downhole tools 300, part or all of a downhole communication system 400 (also referred to as a telemetry system), a mud motor 25, and the drill bit 15. The mud motor 25 can be a positive displacement motor that rotates the drill bit 15 in response to mud flowing through the motor 25 toward the drill bit 15, as is known in the art. Alternatively, the top drive unit 10 may apply a torque to the drill string 20, causing rotation of the drill string 20 and drill bit 15. In any event, rotation of the drill bit 15 cuts into the formation F.

During the make-up phase of a drilling operation, a stand of drill sting tubulars 28 may be coupled together and added to the drill string 20 as the drill string 20 is advanced into the formation F by the cutting action of the drill bit 15. For example, the make-up operation may include coupling a first stand to a second stand. In this example, each stand may include one tubular or multiple tubulars connected end-to-end before presentation to the drill string 20. When a new tubular or stand is ready to be added to the drill string 20, the driller can take-in drill line 6, elevating the top drive unit 10, instrumented sub 32, and blow out preventer 13 above the rig floor 11. The drill string tubular 28 is then positioned below and coupled to the blow out preventer 13 or instrumented sub 32. The bottom end of the tubular 28 is coupled to top end (not numbered) of the existing tubular or drill string 20 positioned partly in the borehole B. Drilling is then initiated and as the drill bit 15 cuts and removes formation F, the driller "pays out" the drill line 6, thereby lowering the traveling block 8, top drive unit 10, and the entire drill string 20 further into the borehole B. The process is repeated as additional drill string tubulars 28 are added to the drill string 20.

During the drilling phase when the drill bit 15 is cutting into the formation F, the fluid control system 22 is used to aid in drilling. The fluid control system 22 may include a mud pump 16, mud tanks (not shown), a surface flow line 17, a stand pipe 9, a return pipe 34, and a collection/recycling system 36. The driller can control the flow and rate of flow of drilling fluid (also referred to as "mud") into the drill string 20 and borehole B by activating the mud pump 16 that is connected to mud tanks (not shown). Drilling fluid is pushed from the mud pump 16 through the surface flow line 17, up the standpipe 9, through a kelly hose 18, into an internal passage 40 of the drill string 20 to the drill bit 15. The drilling fluid exits the drill bit 15 and returns to the surface S through an annular passage 42 of the borehole B defined between the drill string 20 and borehole wall W. The return pipe 34 collects the mud from the annular passage 42 and directs it to a mud treatment system 36, where it is disposed of or recycled back to the drill string 20 via the mud pump 16. The driller can control the rate of flow by altering the pump piston stroke rate of the mud pump 16.

Figure 2:
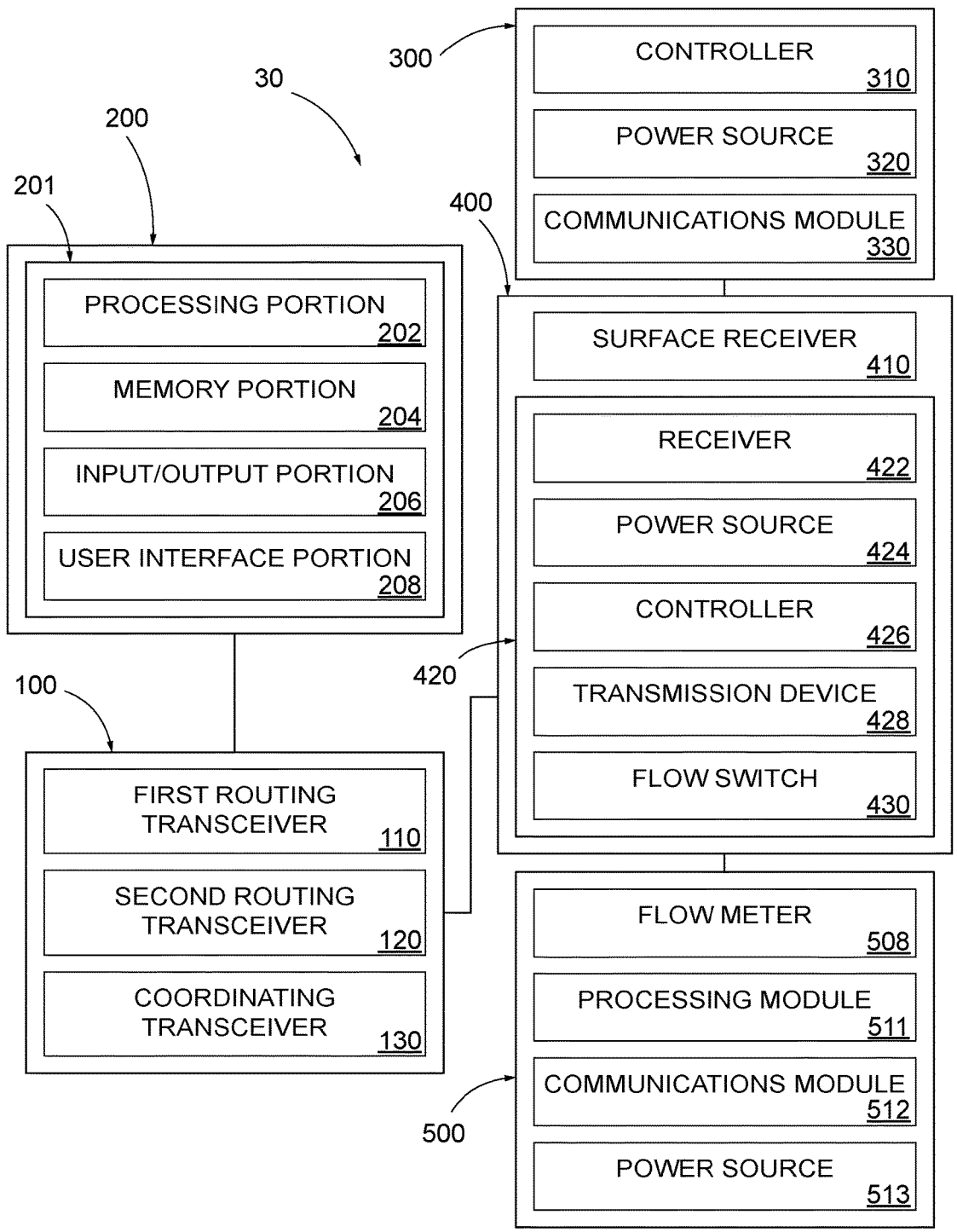
FIG. 2 illustrates a schematic block diagram of a monitoring system for the drilling system illustrated in FIG. 1.

FIG. 2 illustrates a schematic of the monitoring system 30, according to an embodiment of this disclosure. The monitoring system 30 includes the surface communication system 100, the surface control system 200, one or more downhole tools 300, the downhole communication system 400 (or telemetry system), and the flow monitoring system 500. As discussed above, in certain embodiments, the monitoring system may include a separate instrumented top sub 32.

The optional instrumented sub 32 may be situated between the top drive unit 10 and top end 24 of the drill string 20. The instrumented sub 32 is coupled to a rotatable shaft (not numbered) of the top drive unit 10 and above the lower internal blowout preventer 13. The instrumented sub 32 can measure system surface data for a range of parameters for use by rig personnel in a variety of contexts during a drilling operation. For instance, surface data can be used to optimize the drilling operation, for example, by controlling torque during make-up, weight-on-bit (WOB), or monitoring rate-of-penetration (ROP). Analysis of measured surface data and its correlation to downhole data can help preserve downhole tools 300 by predicting, warning, and where necessary, causing a control operation to intervene in the drilling operation in order to mitigate damage. For example, surface data can be used to help identify damaging downhole vibrations and initiate corrective actions or possibly prevent damaging vibrations from occurring. Furthermore, the surface data acquired by the instrumented top sub 32 can be combined with similar data acquired from downhole tools, e.g. such as tools that monitor drilling dynamics, vibration, fluid flow, to aid in controlling the drilling system 1. The instrumented sub 32 may include a controller, a power assembly, a plurality of sensors, a communication device, or still other components used for analyzing drilling data.

The surface communication system 100 is configured to permit communications between the instrumented sub 32 and a surface control system 200 located on the rig floor 11. The communication system 100 preferably is a wireless system, and the present invention encompasses other types of wireless systems, as will be understood by persons familiar with drilling technology. The surface communication system 100 may include the communications device housed in the instrumented sub 32. The communications device can be a radio frequency component, such as a transceiver. The transceiver can be referred to as a "top drive sub radio transceiver." The surface communication system 100 may also include a first radio transceiver 110 (also referred to as a "first routing transceiver") located in proximity to the instrumented sub 32 above the rig floor 11, a second radio transceiver 120 (or "second routing transceiver"), and a third radio transceiver 130 (or a "coordinating transceiver") located in a cabin 12 or other enclosure. The coordinating transceiver 130 is in electronic communication with the control system 200 on the rig floor 11. The Zigbee protocol may be used for wireless communications technology. In the Zigbee protocol, the top drive sub radio transceiver communicates with the coordinating transceiver 130 via one or more of the routing transceivers 110 and 120. The surface communication system 100 may be similar to that described in U.S. Pat. No. 8,525,690 (the "690 patent"), assigned to APS Technology. The entire disclosure of the 690 patent is incorporated by reference into this application.

The surface control system 200 may be communicatively coupled to the surface communication system 100 and the downhole communication system 400. The surface control system 200 is configured to receive, process, and store drilling data obtained from surface sensors located in the instrumented sub 32, and may be further configured to receive, process, and store drilling data obtained from downhole sensors located in the downhole tools 300. The surface control system 200 can include one or more computing devices 201 configured to operate and control various embodiments of the drilling system 1.

The one or more computing devices 201 can host software programs configured to process, monitor, analyze, and display obtained surface data and/or downhole data. The computing devices 201 may be configured to initiate control operations or instructions to one or more components of the drilling system 1, such as the top drive unit 10, stand handling equipment, etc. It will be understood that the surface control system 200 can include any appropriate computing device 201, examples of which include a desktop computing device, a server computing device, or a portable computing device, such as a laptop, tablet or smart phone. In an exemplary configuration, the surface control system 200, and in particular the surface computing devices 201, includes a processing portion 202, a memory portion 204, an input/output portion 206, and a user interface (UI) portion 208. It is emphasized that the block diagram depiction of the surface control system 200 is exemplary and is not intended to imply a specific implementation and/or configuration. The processing portion 202, memory portion 204, input/output portion 206 and user interface portion 208 can be coupled together to allow communications therebetween. It will be appreciated that any of the above components may be distributed across one or more separate devices and/or locations.

The processing portion 202 may include one or more computer processors configured to execute one or more software programs hosted by the surface control system 200. The processing portion 202 may include one or more different types of processors as needed, such as microprocessors, digital signal processor, coprocessors, networking processors, multicore processors, and/or front end processor, and the like.

The memory portion 204 can be volatile (such as some types of RAM), nonvolatile (such as ROM, flash memory, etc.), or a combination thereof, depending upon the exact configuration and type of processor. The surface control system 200 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the surface control system 200.

The input/output portion 206 includes input and output channels through which data is received and transmitted. The input/output portion 206 may include a receiver of the surface control system 200, a transmitter (or transceiver) (not to be confused with components of the surface communication system 100 and downhole communication system 400 described below) of the surface control system 200, and/or electronic connectors for wired connection, or a combination thereof. The input/output portion 206 is capable of receiving and/or providing information pertaining to communication with the surface communication system 100, the downhole communication system 400, or other networks, such as a LAN, WAN, or the Internet. As should be appreciated, transmit and receive functionality may also be provided by one or more devices external to the surface control system 200. For instance, the input/output portion 206 can be in electronic communication with the transceiver 110.

The user interface portion 208 may include an input device and/or display (input device and display not shown) that allows a user to communicate with the surface control system 200. The user interface 208 can include input features that provide the ability to control the surface control system 200 and thus components of the drilling system 1, via, for example, buttons, soft keys, a mouse, voice actuated controls, a touch screen, movement of the surface control system 200, visual cues (e.g., moving a hand in front of a camera on the surface control system 200), or the like. The user interface 208 can provide outputs, including visual information, such as the visual indication of the plurality of operating ranges for one or more parameters via the display (not shown). Other outputs can include audio information (e.g., via speaker), mechanically (e.g., via a vibrating mechanism), or a combination thereof. In various configurations, the user interface 208 can include a display, a touch screen, a keyboard, a mouse, an accelerometer, a motion detector, a speaker, a microphone, a camera, or any combination thereof. The user interface 208 can further include any suitable device for inputting biometric information, such as, for example, fingerprint information, retinal information, voice information, and/or facial characteristic information, for instance, so as to require specific biometric information for access to the surface control system 200.

The surface control system 200 can host one or more software programs that can initiate desired decoding or signal processing, and perform various methods for monitoring and analyzing the drilling data obtained during the drilling operation. In use, the user interface 208 of the surface control system 200 runs on a display device, such as a console and is the interface between the drilling operator (and other end users) and the instrumented sub 32. The driller may input a range of commands via the user interface 208 regarding operation of the instrumented sub 32. The operator may also input data for initializing depth tracking, well name, etc. During a drilling operation, sensors obtain the data and that data is transmitted to the surface control system 200 via the surface communication system 100. The computer processor 202 is configured to execute software program that processes data obtained by the sensors, parses the data, timestamps that data, and records the data in job files in the computer memory 204. The user interface 208 can cause the obtained data to be displayed on the display device. For example, the obtained data can be arranged into current and historical data logs (time or depth-based logs) and displayed on a display device. Other software programs can process and analyze the obtained data and create informative meta-data, such as WOB derived from hookload. The stored data and related data files are available for export via standard wired or wireless connections with other components of the drilling system, such as the electronic data recorder. The surface control system 200 also enables for example, WITS data transfer, serial input of MWD downhole data, etc.

The downhole tools 300 may include a directional tool (e.g. a rotary steerable tool) and/or a measurement-while-drilling (MWD) tool, and/or other tools used downhole in a drilling operation. Each of the downhole tools 300 may include a controller 310, a power source 320, and a communications module 330. The downhole tools 300 may be configured to obtain downhole data during a drilling operation, depending on the configuration of the tools. For instance, MWD tools include several sensing modules used to measure various parameters downhole.

The downhole communications system 400 is configured to transmit downhole data to the surface control system 200. The downhole data may include data received from the downhole tools 300 or the flow monitoring system 500. The downhole communications system 400 can include at least one surface receiver 410 and a telemetry tool 420. The telemetry tool 420 can include a receiver 422, a power source 424, a controller 426, a transmission device 428 configured to transmit a signal to the surface receiver 410, and a flow switch 430. The signal can include drilling data encoded therein concerning the data obtained via the downhole sensors. The downhole communications system 400 may be a mud-pulse telemetry system, or other telemetry systems configured to transmit information to the surface control system 200. For example, the downhole communications system 400 may be an electromagnetic telemetry system, acoustic telemetry system, or a wired pipe system.

The transmission device 428 may be in the form of a rotary pulser, the receiver 410 may be in the form of a pressure pulsation sensor, and the flow switch 430 may be in the form of a switching device. The pulser 428 is used to transmit signals through the drilling mud to the surface receiver 410. The switching device 430 senses whether drilling mud is being pumped through the drill string 20. The switching device 430 is communicatively coupled to the controller 426. The controller 426 can store data when drilling mud is not being pumped, as indicated by the output of the switching device 430. A suitable switching device 430 can be obtained from APS Technology as the FlowStat™ Electronically Activated Flow Switch. The controller of the instrumented sub 32 can encode the information it receives from the downhole tools 300 or the flow monitoring system 500 as a sequence of pressure pulses. The controller 426, in response to inputs received, can cause the pulser 428 to generate the sequence of pulses in the drilling mud. The pressure pulsation sensor can be a strain-gage pressure transducer (not shown) located at the surface S that can sense the pressure pulses in the column of drilling mud, and can generate an electrical output representative of the pulses received from the downhole pulser 428. The electrical output of a transducer at the surface S can be transmitted to the surface control system 200, which can decode and analyze the data originally encoded in the mud pulses.

A processor can reduce the signal-to-noise ratio of mud pulse signals transmitted by a mud pulser 428 located downhole based at least partially on a measurement of the pressure of the fluid obtained by the instrumented sub 32. The drill monitoring system 30 may include an input pressure sensor assembly positioned on an input line of the mud system between a pump 16 and the instrumented sub 32. The input pressure sensor assembly can measure pressure of the fluid at the input line. The processor is configured to reduce the signal-to-noise ratio of mud pulse signals transmitted by the mud pulser 428 located downhole based at least partially on a measurement of the pressure of the fluid obtained by the instrumented sub 32 and the input line.

Figure 3A:
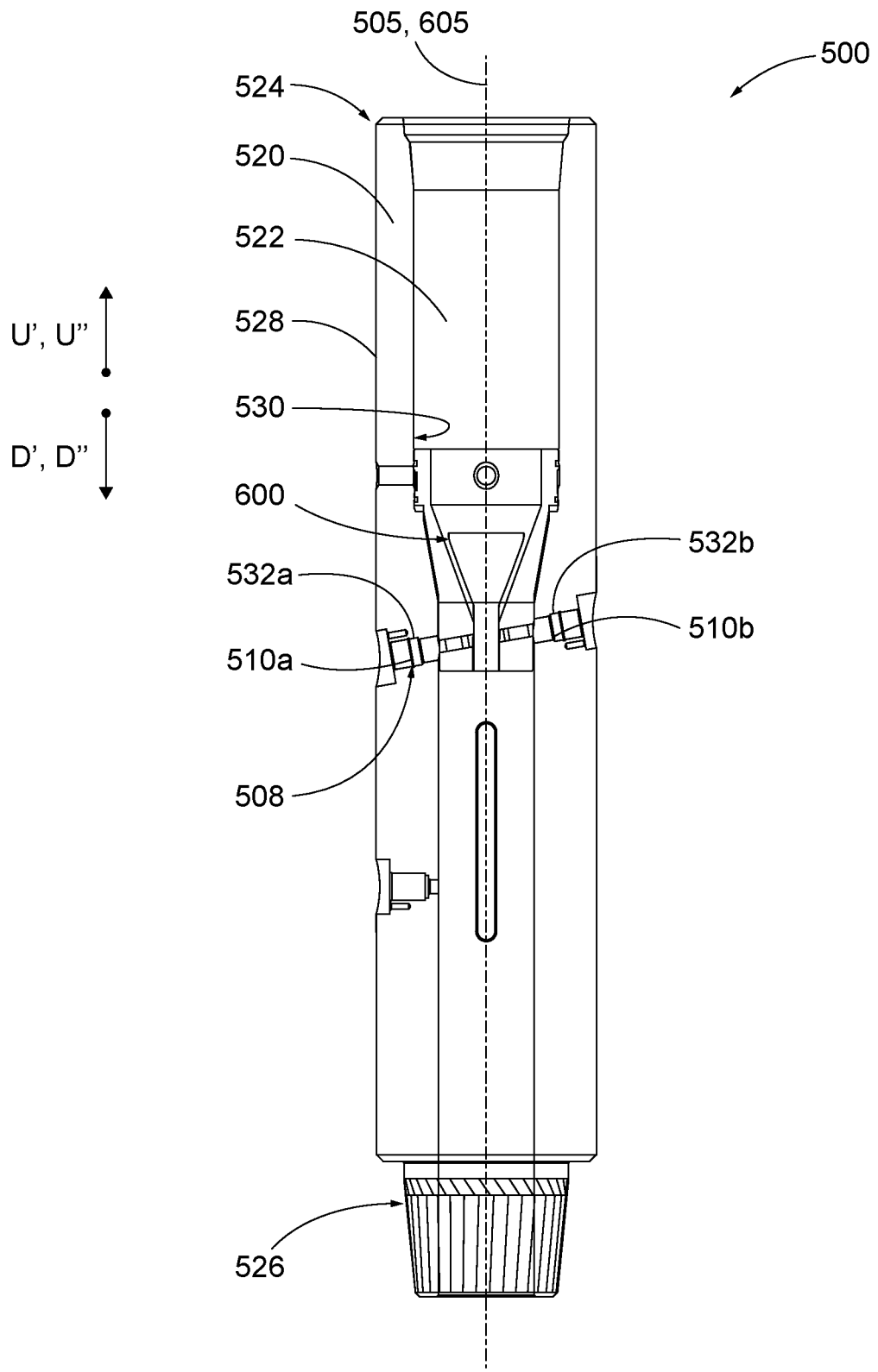
FIG. 3A illustrates a side transparent view of a flow monitoring system, according to an embodiment of the disclosure.
Figure 3B:
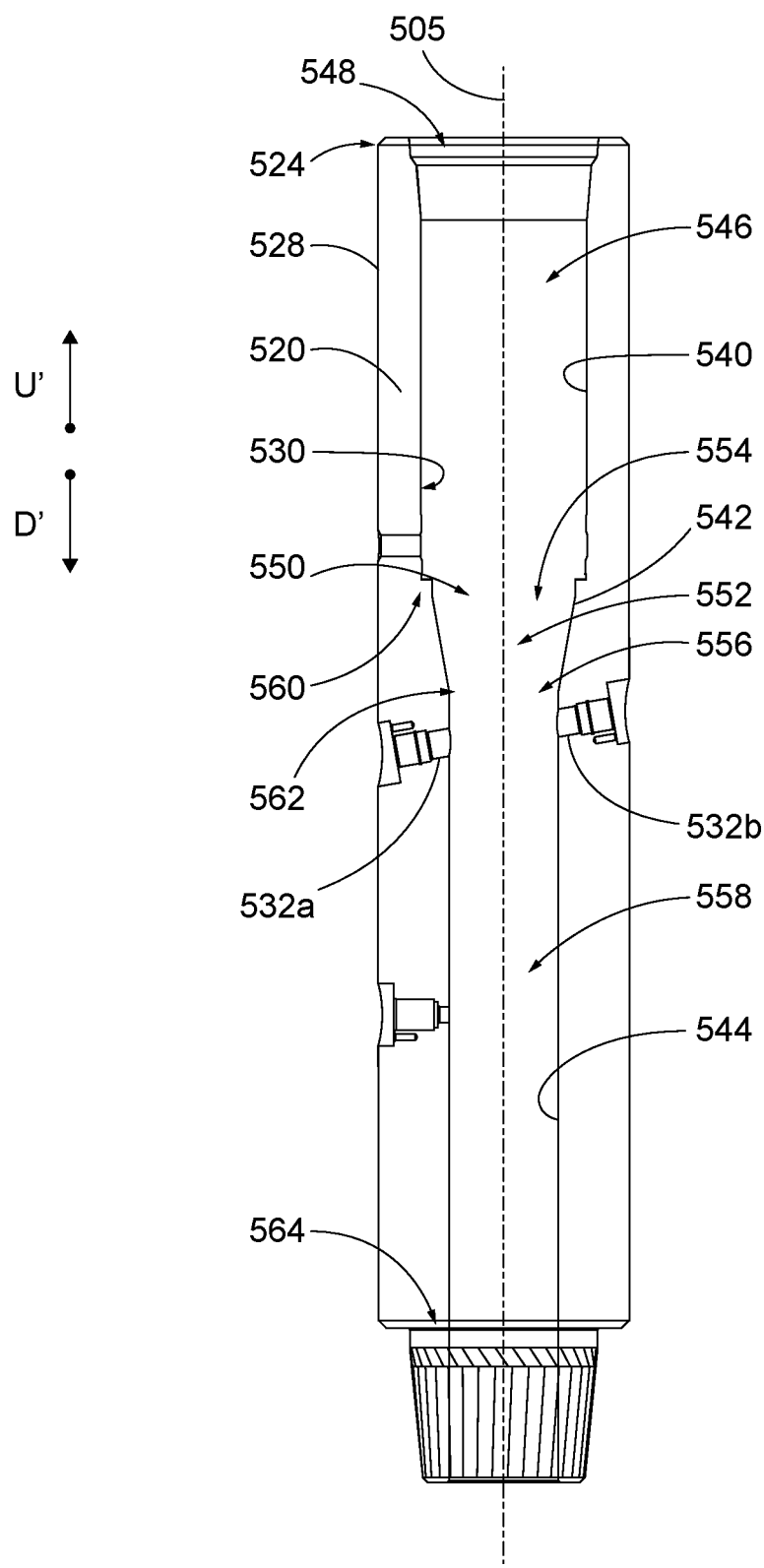
FIG. 3B illustrates a cross sectional view a drill string component of the flow monitoring system illustrated in FIG. 3A.
Figure 3C:
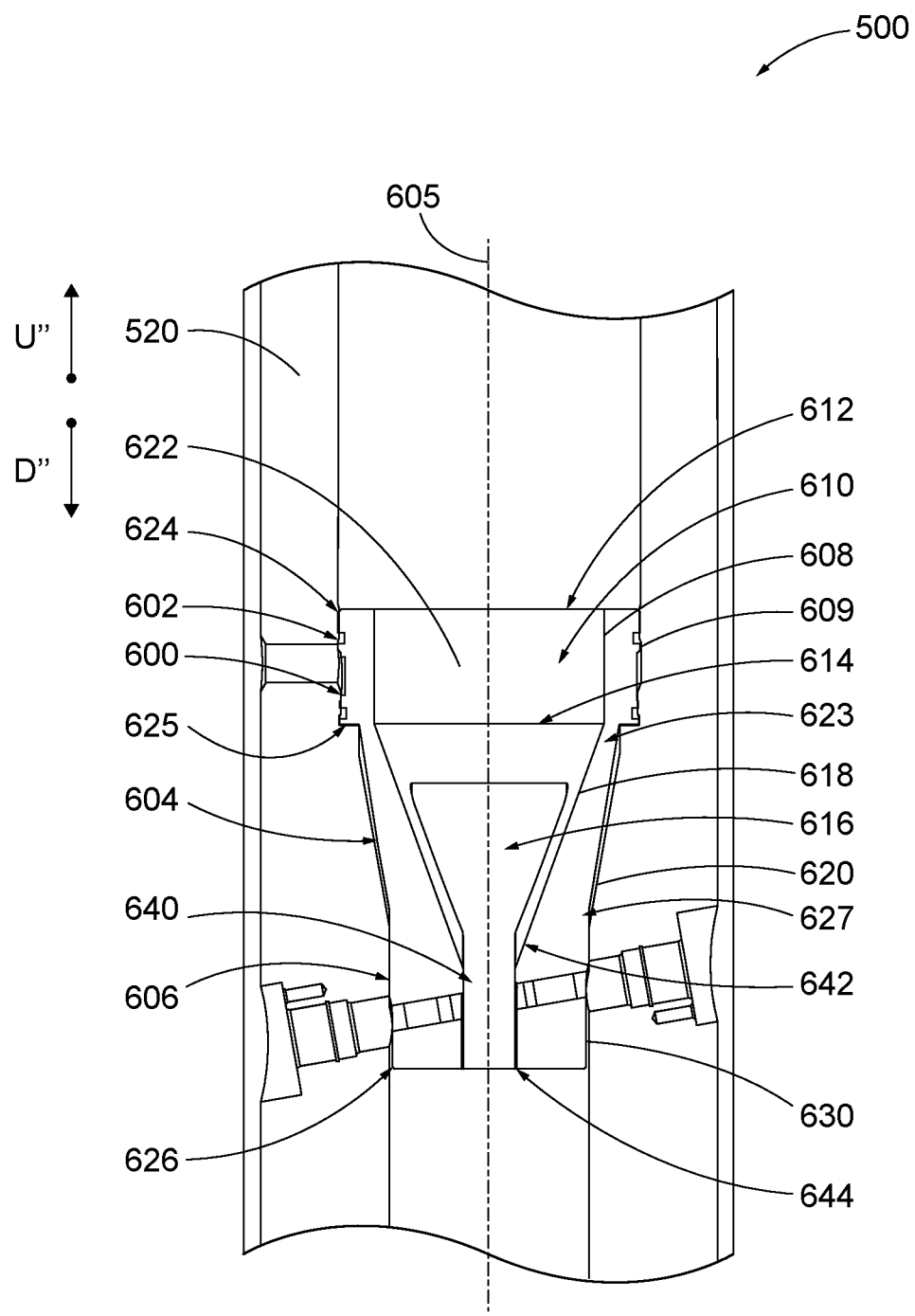
FIG. 3C illustrates a side cross section view of the flow monitoring system illustrated in FIG. 3A.

FIGS. 3A-3C illustrates a flow monitoring system 500 according to an embodiment of the present disclosure. Referring to FIG. 3A, the flow monitoring system 500 includes a conduit 520, a flow meter 508 carried by the conduit 520, and a flow diverter 600. In certain embodiments, the flow monitoring system 500 includes a processing module 511, a communications module 512, and a power source 513 (See FIG. 2). The flow meter 508 is configured to obtain measurements that are indicative of flowrate, density, and/or still other parameters of the drilling fluid within the drill string 20. In other words, the flow meter 508 may obtain data, which, in turn, is used by the processing module 511 to determine the volumetric flow rate and/or density of the fluid. The communications module 512 can communicate the determined values and/or the raw data to the appropriate communications system. In most cases, regardless of where the flow monitoring system is located, the flow meter 508 may provide frequent measures of fluid parameters to the appropriate communications system 200, 400 via the meter communications module 512. In other alternative embodiments, the flow monitoring system 500 may include one or more additional sensors used to obtain data. For example, the conduit may include a temperature sensor and/or a pressure sensor. Other sensors may be used as well.

The flow monitoring system 500 can be used anywhere on the drilling system 1 where drilling fluid is flowing. In one example, the flow monitoring system 500 may form part (or the whole) of the instrumented top sub 32 as illustrated in FIG. 1. In such an example, the conduit 520 may be same as the sub body of the instrumented top sub 32. In another example, a flow monitoring system 501 may form part of the drill string 20 that is located in the borehole B. In such an example, the conduit 520 is disposed along a downhole end of the drill string 20. In another example, a flow monitoring system 502 is disposed along a surface flow line 17, the stand pipe 9 or Kelly hose 18. In such an example, the conduit 520 may form part of the surface flow line, the stand pipe 9, and/or is attached to the Kelly hose 18. In still another example, a flow monitoring system 503 is disposed along a return line pipe 34 of the mud control system 22. In such an example, the conduit 520 may form part of the return line pipe 34. The flow monitoring system 501, 502 and 503 are the same as the flow monitoring system 500 and common reference numbers are used to identify common features.

Continuing with FIGS. 3A-3C, the conduit 520 is an elongated body that extends along a central axis 505. The conduit 520 defines an internal passage 522 that extends through the conduit 520 and is configured to receive drilling fluid therethrough. The conduit 520 has an upper end 524 and a lower end 526 opposite the upper end 524 along the central axis 505. The upper and lower ends 524 and 526 may include threaded connectors for coupling to components of the drilling system 1 where it is located. The connectors defined by the upper end 524 and the lower end 526 can be made according to API standards. The conduit 520 further includes an outer surface 528, an inner surface 530, a plurality of internal bores 532a, 532b. As shown, the conduit 520 includes a first internal bore 532a and a second internal bore 532b. The internal bores 532a, 532b extend from the outer surface 528 to the inner surface 530. The inner surface 530 extends from the upper end 524 to the lower end 526 and defines the internal passage 522.

The flow meter 508 may be housed at least partially within the conduit 520. The flow meter 508 can obtain data that is indicative of a flow rate of the fluid passing through a measurement zone of the internal passage 522. In one example, the flow meter 508 includes a sensor housing, a first transducer 510a, a second transducer 510b, and wiring for electrical connection to the power source, processing module 511 and communications module 513.

Each transducer 510a,510b includes an outer end and an inner end opposite to the outer end. The inner end defines a sensor face. The outer end of each sensor is placed within the internal bore 532a and 532b such that the sensor face is positioned inside the internal passage 522 and spaced apart from an inner surface 530 of the conduit 522 toward the central axis 505. In the illustrated embodiment, the first transducer 510a is placed with the first internal bore 532a such at least a portion of the first transducer 510a extends into the internal passage 522. The second transducer 510b is placed with the first internal bore 532b such at least a portion of the first transducer 510b extends into the internal passage 522. In one example, each transducer 510a,510b includes an outer end, an inner end opposite to the outer end. The inner end defines a sensor face. The outer end of each sensor is placed within the internal bore 532a and 532b such that the sensor face is positioned inside the internal passage 522 and spaced apart from an inner surface 540 of the conduit toward the central axis 505. Thus, the first and second transducers 510a, 510b each have sensor face that is contact with fluid passing through the internal passage 522. The flow meter 508 may measure the velocity of a fluid with an ultrasound via the first transducer 510a and the second transducer 510b. As shown, the first transducer 510a may be positioned at least partially downstream with respect to the second transducer 510b. The transducers 510a and 510b may be of the type that includes a piezoelectric crystal that is coupled to or define the sensor face that is closest to the central axis 505. The present invention, however, is not intended to be limited to any particular type of transducer unless expressly claimed. The average velocity of the flow of the fluid is determined along the path of a beam of ultrasound emitted from one of the transducers 510a or 510b. In one example, the downstream transducer 510a receives a signal from the upstream transducer 510b, and then the downstream transducer 510a sends a signal back to the upstream transducer 510b. The difference in time it takes for each signal to reach its destination may be used to determine the velocity of the fluid within the internal passage 522. The fluid velocity measurements made used to determine mud density as is known in the art.

FIG. 3B illustrates a side cross sectional view of the conduit 520, according to an embodiment of this disclosure. The inner surface 530 includes a first inner surface 540, a second inner surface 542, and a third inner surface 544. The first inner surface 540 extends circumferentially about the central axis 505 and extends longitudinally along the central axis 505 defining a first inner channel 546. The first inner channel 546 includes a first channel opening 548 at the upper end 524 of the conduit 520, and a second channel opening 550 spaced from the first channel opening 548 in a downhole direction D'. The first channel opening 548 opens to a portion of the drill string 20 uphole from the conduit 520. The second channel opening 550 opens to a second inner channel 552 downhole from the first inner channel 546. In an embodiment, the first inner channel 546 may be parallel to the central axis 505, whereby the first channel opening 548 has a substantially similar diameter to the second channel opening 550.

Continuing with FIG. 3B, the second inner surface 542 extends circumferentially about the central axis 505 and extends longitudinally along the central axis 505 defining the second inner channel 552. The second inner channel 552 includes a third channel opening 554 at an uphole end of the second inner channel 552, and a fourth channel opening 556 spaced from the third channel opening 554 in the downhole direction D'. The third channel opening 554 opens to the first inner channel 546, such that the first inner channel 546 is in fluid communication with the second inner channel 552. The fourth channel opening 556 opens to a third inner channel 558 downhole from the first inner channel 546 and the second inner channel 552.

Continuing with FIG. 3B, in an embodiment, the second inner channel 552 is parallel to the central axis 505, whereby the third channel opening 554 has a substantially similar diameter to the fourth channel opening 556. In an alternative embodiment, the second inner surface 542 extends outwardly from the fourth channel opening 556 to the third channel opening 554, forming a conical shape about the central axis 505. In this embodiment, the third channel opening 554 may have a larger diameter than the fourth channel opening 556.

The second channel opening 550 is adjacent to the third channel opening 554. In an embodiment, the diameter of the third channel opening 554 is less than the diameter of the second channel opening 550 forming a shoulder 560. The shoulder 560 extends circumferentially about the central axis 505. It will be appreciated that a "shoulder" as used herein may include a variety of shapes, for example, semi-circular, rectangular, triangular, or the like.

The third inner surface 544 extends circumferentially about the central axis 505 and extends longitudinally along the central axis 505 defining the third inner channel 558. The first inner channel 546, the second inner channel 552, and the third inner channel 558 compose the internal passage 522 of the conduit 520. The third inner channel 558 includes a fifth channel opening 562 at an uphole end of the third inner channel 558, and a sixth channel opening 564 downhole from the fifth channel opening 562. The fifth channel opening 562 opens to the second inner channel 552, such that the first inner channel 546 is in fluid communication with the second inner channel 552. The sixth channel opening 564 opens to a connector at the lower end 526 of the conduit 520. In an embodiment, the third inner surface 540 is parallel to the central axis 505, whereby the fifth channel opening 562 has a substantially similar diameter to the sixth channel opening 564.

The internal bores 532a and 532b may be positioned towards an uphole-end or inlet end of the third inner channel 558. The outer surface 528 of the conduit 520 may be in fluid communication with the third inner channel 558 via the internal bores 532.

FIG. 3C illustrates a side cross sectional view of the flow monitoring system 500 with the flow diverter 600 positioned within the conduit 520, according to an embodiment of this disclosure. The flow diverter 600 extends elongate along a central diverter axis 605 and includes a head portion 602, a support portion 604, and a body portion 606. The head portion 602 may be positioned at an uphole most end and the body portion 606 may be positioned at a downhole most end, with the support portion 604 between the head portion 602 and the support portion 604. The flow diverter 600 defines an internal passage 622 that extends through the flow diverter 600 and is configured to receive drilling fluid therethrough. The flow diverter 600 has an upper end 624 and a lower end 626 opposite the upper end 624 along the central diverter axis 605.

The head portion 602 includes a head inner surface 608 and a head outer surface 609. The head inner surface 608 extends circumferentially about the central diverter axis 605 and extends longitudinally along the central diverter axis 605. The head inner surface 608 defines a head channel 610 that includes a first head opening 612 at the upper end 624 of the flow diverter 600 and a second head opening 614 positioned downhole from the first head opening 612 in a downhole direction D". The first head opening 612 opens to the head outer surface 609, and the second head opening 614 opens to a support channel 616 downhole from the head channel 610. In an embodiment, the head channel 610 may be parallel to the central diverter axis 605, whereby the first head opening 612 has a substantially similar diameter to the second head opening 614.

The head outer surface 609 extends circumferentially about the central diverter axis 605 and extends longitudinally along the central diverter axis 605. The diameter of the head outer surface 609 may be substantially similar to or slightly less than the diameter of the first inner surface 540 of the conduit 520. The outer head surface 609 may be configured to slide within the first inner channel 546 of the conduit 520.

The support portion 604 includes an inner support surface 618 and an outer support surface 620. The inner support surface 618 extends circumferentially about the central diverter axis 605 and extends from a first support end 623 to a second support end 627 spaced from the first support end 623 in the downhole direction D". The inner support surface 618 defines the support channel 616 that extends through the support portion 604 from the first support end 623 to the second support end 627.

In an embodiment, the support channel 616 is parallel to the central diverter axis 605, whereby a diameter of the inner support surface 618 at the first support end 623 is substantially similar to a diameter of the inner support surface 618 at the second support end 627. In an alternative embodiment, the inner support surface 618 extends inwardly from the first support end 623 to the second support end 627, forming a conical shape about the central diverter axis 605.

The outer support surface 620 is parallel to the central diverter axis 605, whereby a diameter of the outer support surface 620 at the first support end 623 is substantially similar to a diameter of the outer support surface 620 at the second support end 627. In an alternative embodiment, the outer support surface 620 extends inwardly such that a diameter of the outer support surface 620 at the first support end 623 is greater than a diameter of the outer support surface 620 at the second support end 627, forming a conical shape about the central diverter axis 605.

The head portion 602 is positioned above the support portion 604 in an uphole direction U" adjacent to the first support end 623 such that a diverter shoulder 625 is formed between the support portion 604 and the head portion 602. The diverter shoulder 625 may extend circumferentially about the central diverter axis 605.

Figure 4:
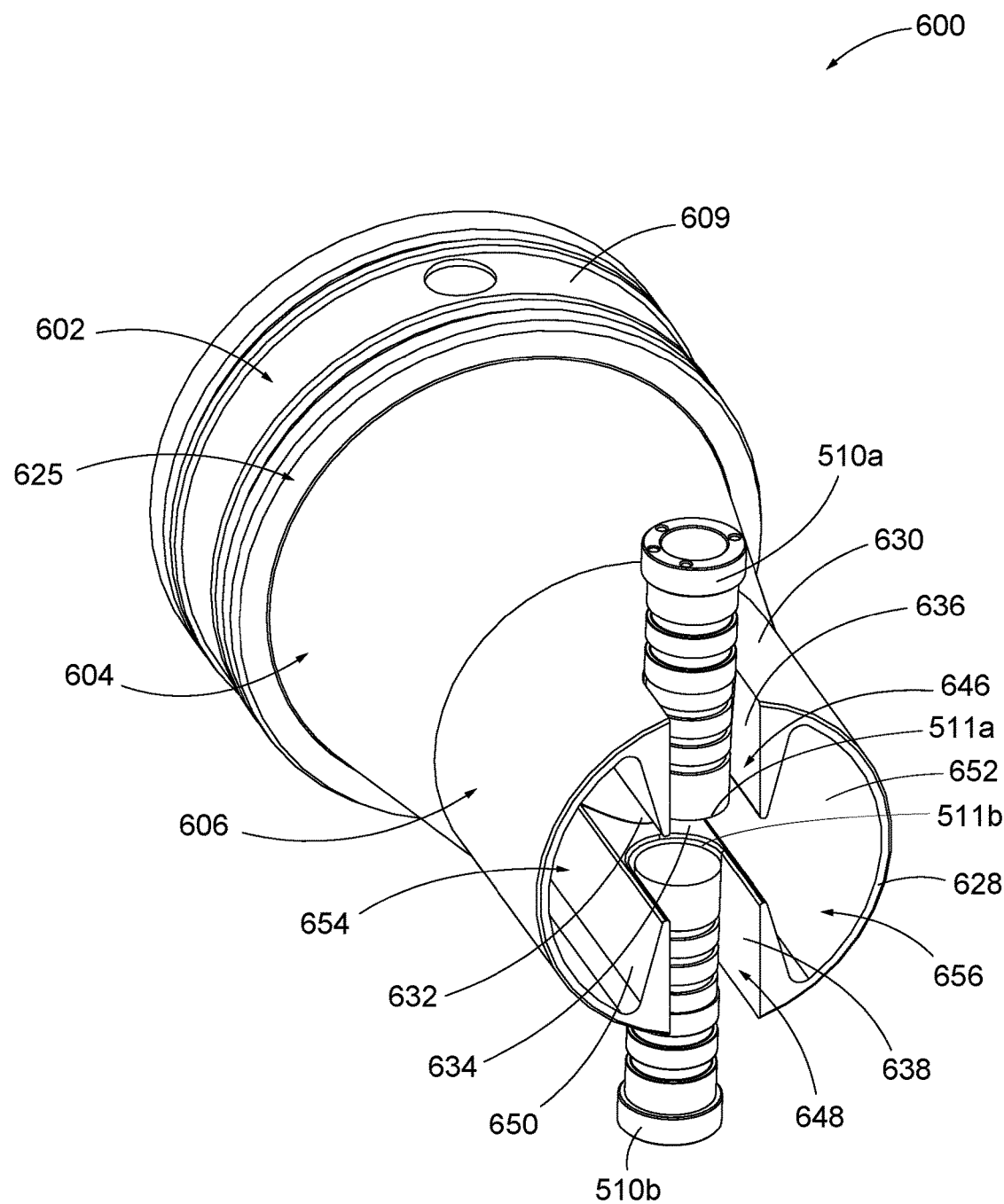
FIG. 4 is a perspective view of a flow diverter, according to an embodiment of the disclosure.

With reference to FIG. 3C and FIG. 4, which illustrates a perspective view of the diverter 600 with other parts removed for clarity, the body portion 606 is positioned below the support portion 604 in the downhole direction D" adjacent to the second support end 627 of the support portion 604. The body portion 606 includes a bottom body surface 628, an outer body surface 630, a first inner surface 632, a second inner surface 634, a third inner surface 636, and a fourth inner surface 638. The first inner surface 632 and the second inner surface 634 define a body channel 640 that extends through the body portion 606 from a first body opening 642 to a second body opening 644 spaced from the first body opening 642 in the downhole direction D". The first body opening 642 opens to the support channel 616 of the support portion 604. The second body opening 644 opens to the bottom body surface 628.

The third inner surface 636 and the fourth inner surface 638 define a first side body channel 646 and a second side body channel 648, respectively. Both the first and second side body channels 646 and 648 extend from the second inner surface 634 to the outer body surface 630. The first side body channel 646 may oppose the second side body channel 648 in a radial direction. The radial direction may be perpendicular to the central diverter axis 605. Alternatively, the first and second side body channels 646 and 648 may oppose each other in a direction offset from the radial direction. In an embodiment, one or both the first and second side body channels 646 and 648 open to the bottom body surface 628.

The first inner surface 632 extends from the first body opening 642 to the second inner surface 634 and extends at least partially circumferentially about the central diverter axis 605. The second inner surface 634 extends from the first inner surface 632 to the bottom body surface 628 and extends at least partially circumferentially about the central diverter axis 605.

In an embodiment, the first inner surface 632 is parallel to the central diverter axis 605, whereby a diameter of the first inner surface 632 at the first body opening 642 is substantially similar to a diameter of the first inner surface 632 at the intersection of the first inner surface 632 and the second inner surface 634. In an alternative embodiment, the inner support surface 618 extends inwardly from the first body opening 642 to the intersection of the first inner surface 632 and the second inner surface 634, forming at least a partial conical shape about the central diverter axis 605, whereby the diameter of the inner support surface 618 at the first body opening is greater than the diameter of the first inner surface 632 at the intersection of the first inner surface 632 and the second inner surface 634. In an embodiment, the first inner surface 632 extends in a substantially similar direction as the inner support surface 618 forming a continuous surface that extends from first support end 623 to the second inner surface 634.

In an embodiment, the body portion 606 may include additional first and second inner surfaces 632 and 634. For example, a first additional inner surface (not visible in figures) may oppose the first inner surface 632, and a second additional inner surface (not visible in figures) may oppose the second inner surface 634. A fifth inner surface 650 and a sixth inner surface 652 may be positioned between the first inner surface 632 and the first additional surface, and between the second inner surface 634 and the second additional surface. The fifth inner surface 650 defines a first lobe channel 654, and the sixth inner surface 652 defines a second lobe channel 656. It will be appreciated that the body portion 606 may include fewer or more inner surfaces or lobe channels. The first and second lobe channels 654 and 656 extend from the first body opening 642 to the second body opening 644. The first and second lobe channels 654 and 656, the head channel 610, the support channel 616, and the body channel 640 compose the internal passage 622 of the flow diverter 600.

The diverter 600 may be formed of a single continuous part, or alternatively, the head portion 602, the support portion 604, and the body portion 606 may be coupled together using screws, glue, adhesives, or other methods known in the art.

The diverter 600 is configured to be slideably received within the internal passage 522 of the conduit 520. The diverter 600 may be inserted into the first channel opening 548 at the upper end 524 of the conduit 520. The diverter 600 may be moved in the downhole direction D' until the body portion 606, the support portion 604, and the head portion 602 are slidably placed within the third inner channel 558, the second inner channel 552, and the first inner channel 546 of the conduit 520, respectively. In an embodiment, the head outer surface 609 may be in contact with the inner surface 530 of the drill string 520, the outer support surface 620 may be in contact with the second inner surface 542 of the drill string 520, and the outer body surface 630 may be in contact with the third inner surface 544 of the drill string 520. The diverter shoulder 625 may align with the shoulder 560 of the conduit 520.

The diverter 600 may be supported within the internal passage 522 of the drill string 520 by the contact between the outer surfaces 609, 620, and 630 of the diverter 600 with the inner surfaces 530, 542, and 544 of the conduit 520. The diverter 600 may further be supported by drill string 520 by the alignment of the diverter shoulder 625 with the shoulder 560.

The diverter 600 may be positioned within the internal passage 522 of the conduit 520 such that the internal bores 532a and 532b align with the first and second side body channels 646 and 648. The alignment of the internal bores 532a and 532b with the first and second side body channels 646 and 648 forms a pair of continuous channels that extend from the internal passage 622 of the flow diverter 600 to the outer surface 528 of the conduit 520. The first transducer 510a and the second transducer 510b may be placed at least partially within the internal bores 532a and 532b and the first and second side body channels 646 and 648. The first and second transducers 510a and 510b may be positioned within the internal passage 522 of the conduit 520 adjacent to the flow diverter 600. A face end 511a of the first transducer 510a and a face end 511b of the second transducer 510b are positioned in the internal passage 522 so that they are in fluid communication with the internal passage 622 of the diverter 600. In an embodiment, the face ends 511a and 511b of the first and second transducers 510a and 510b may not extend into the internal passage 622 of the diverter 600.

During a drilling operation, drilling fluid enters the conduit 520 at a high velocity and flows through the internal passage 522 of the conduit 520 and through the internal passage 622 of the diverter 600. The geometry of the diverter 600 (in the embodiment shown in the figures) converges or narrows the flow path of the drilling fluid within the body portion 606. The body portion 606 may provide protection for the first and second transducers 510a and 510b from the drilling fluid while the first and second transducers 510a and 510b are positioned within the internal passage 522 of the drill string 520. The diverter 600 may protect the first and second transducers 510a and 510b from abrasive effects caused by the force of the high velocity fluid flow within the conduit 520.

As the drilling fluid flows within the body portion 606, the downstream transducer 510a receives a signal from the upstream transducer 510b, and then the downstream transducer 510a sends a signal back to the upstream transducer 510b. The difference in time it takes for each signal to reach its destination may be used to determine the velocity of the fluid within the body portion 606.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A flow monitoring system for monitoring fluid flow in a drilling system, comprising:
    a conduit having an inner surface and an outer surface, the inner surface defining a flow channel extending through the conduit, the conduit defining a first bore and a second bore, the first bore and the second bore extending from the inner surface to the outer surface;

a first transducer positioned within the first bore such that at least a portion of the first transducer extends into the flow channel; and a second transducer positioned within the second bore such that at least a portion of the second transducer extends into the flow channel wherein the second transducer can send and receive signals propagating through at least a portion of the flow channel to and from the first transducer, wherein the flow channel is narrowed such that the first transducer and the second transducer are protected from at least some of the fluid flow when fluid is flowing through the flow channel.

2. The flow monitoring system of claim 1, further comprising:

a flow diverter positioned within the flow channel of the conduit adjacent to the first transducer and the second transducer.

3. The flow monitoring system of claim 2, wherein the flow diverter defines a diverter channel that extends therethrough, the diverter channel having a diameter dimension, and wherein the first transducer extends from the inner surface of the conduit into the flow channel to a first transducer end, and wherein the second transducer extends from the inner surface of the conduit into the flow channel to a second transducer end, and wherein a distance between the first transducer end and the second transducer end is greater than the diameter dimension of the diverter channel.

4. The flow monitoring system of claim 3, wherein the first transducer opposes the second transducer in a radial direction.

5. The flow monitoring system of claim 4, wherein the first transducer is positioned towards an upstream end of the conduit relative to the second transducer.

6. The flow monitoring system of claim 1, wherein the conduit is a portion of drilling pipe.

7. The flow monitoring system of claim 6, wherein the drilling pipe has a means for being coupled to a drill string.

8. The flow monitoring system of claim 1, wherein the conduit is at least a portion of a top sub.

9. The flow monitoring system of claim 1, wherein the conduit is a portion of a mud inlet pipe.

10. The flow monitoring system of claim 1, wherein the conduit is a portion of a mud return pipe.

11. The flow monitoring system of claim 1, wherein each transducer includes an outer end and an inner end opposite to the outer end and that is spaced inwardly from the inner surface of the conduit.

12. The flow monitoring system of claim 11, wherein the inner end of each transducer defines a sensor face inside the internal passage.

13. A flow monitoring system for a drilling system, comprising:

a conduit having an inner surface and an outer surface, the inner surface defining a flow channel extending therethrough, the conduit defining a bore extending from the inner surface to the outer surface;

a first transducer positioned within the bore of the conduit, such that at least a portion of the first transducer extends into the flow channel;

a second transducer positioned such that the second transducer can send and receive signals propagating through at least a portion of the flow channel to and from the first transducer; and a flow diverter positioned within the flow channel of the conduit adjacent to the first transducer and the second transducer, wherein the flow diverter partially surrounds the first and second transducers.

14. The flow monitoring system of claim 13, wherein the flow diverter comprises:

a support portion including an outer support surface and an inner support surface, the inner support surface defining a support channel that extends through the support portion from a first support end to a second support end, the second support end being spaced from the first support end in a downhole direction, wherein a diameter of the outer support surface at the first support end is greater than a diameter of the outer support surface at the second support end; and a body portion positioned below the support portion in the downhole direction adjacent to the second support end, the body portion including a bottom body surface, an outer body surface, a first inner surface, a second inner surface positioned below the first inner surface in the downhole direction, and a third inner surface, wherein the first inner surface and the second inner surface define a body channel that extends through the body portion from a first body opening to a second body opening spaced from the first body opening in the downhole direction, wherein the first body opening opens to the support channel, and the second body opening opens to the bottom body surface, and wherein the third inner surface defines a side body channel that extends from the second inner surface to the outer body surface.

15. The flow monitoring system of claim 14, wherein a diameter of the first body opening has a first diameter dimension, and a diameter of the second inner surface at an intersection with the first inner surface has a second diameter dimension, wherein the second diameter dimension is less than the first diameter dimension.

16. The flow monitoring system of claim 14, wherein the second diameter dimension is uniform along a length from the first inner surface to the second end of the body portion.

17. The flow monitoring system of claim 14, wherein the outer support surface comprises a conical shape.

18. The flow monitoring system of claim 14, wherein the third surface defines an opening at the second end of the body portion.

19. The flow monitoring system of claim 14, wherein the third inner surface defines a first channel, wherein the first transducer positioned within the first channel, the first transducer extending from the outer surface of the body portion towards the second inner surface of the body portion.

20. The flow monitoring system of claim 14, wherein the body portion further includes a fourth inner surface that extends from the outer surface of the body portion to the second inner surface of the body portion, wherein fourth inner surface defines a second channel, wherein the second transducer is positioned within the second channel, the second transducer extending from the outer surface of the body portion towards the second inner surface of the body portion.

21. The flow monitoring system of claim 20, wherein the first channel is aligned with the second channel such that the first channel and second channel extend along a channel axis.

22. The flow monitoring system of claim 21, wherein the second inner surface defines a flow diverter channel that extends along a longitudinal axis, wherein the channel axis is offset from the flow diverter channel by less than 90°.

23. The flow monitoring system of claim 13, wherein the conduit is a portion of drilling pipe.

24. The flow monitoring system of claim 23, wherein the drilling pipe has a means for being coupled to a drill string.

25. The flow monitoring system of claim 13, wherein the conduit is at least a portion of a top sub.

26. The flow monitoring system of claim 13, wherein the conduit is at least a portion of a mud inlet pipe.

27. The flow monitoring system of claim 13, wherein the conduit is at least a portion of a mud return pipe.

28. The flow monitoring system of claim 13, wherein each transducer includes an outer end and an inner end opposite to the outer end and that is spaced inwardly from the inner surface of the conduit.

29. The flow monitoring system of claim 28, wherein the inner end of each transducer defines a sensor face inside the internal passage.

* * * * *